United States Patent
Morita (10) Patent No.: US 7,610,558 B2
(45) Date of Patent: Oct. 27, 2009

(54) INFORMATION PROCESSING APPARATUS AND METHOD

(75) Inventor: Kenji Morita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1022 days.

(21) Appl. No.: 10/354,006

(22) Filed: Jan. 30, 2003

(65) Prior Publication Data

US 2003/0156144 A1 Aug. 21, 2003

(30) Foreign Application Priority Data

Feb. 18, 2002 (JP) ............................. 2002-040092

(51) Int. Cl.
*G06F 3/048* (2006.01)
*G06F 3/01* (2006.01)

(52) U.S. Cl. ...................... 715/757; 715/750; 715/751; 463/32; 463/34

(58) Field of Classification Search ................. 715/848; 348/8
See application file for complete search history.

(56) References Cited

U.S. PATENT DOCUMENTS

| | | | | |
|---|---|---|---|---|
| 4,398,799 A * | 8/1983 | Swift | ......................... | 359/632 |
| 5,381,158 A * | 1/1995 | Takahara et al. | ............. | 345/156 |
| 5,583,526 A * | 12/1996 | Socks et al. | .................... | 345/8 |
| 5,590,062 A * | 12/1996 | Nagamitsu et al. | ............. | 703/6 |
| 5,638,300 A * | 6/1997 | Johnson | ...................... | 702/153 |
| 5,659,691 A * | 8/1997 | Durward et al. | ............. | 715/757 |
| 5,704,836 A * | 1/1998 | Norton et al. | ................ | 463/36 |
| 5,786,804 A * | 7/1998 | Gordon | ....................... | 345/158 |
| 5,803,810 A * | 9/1998 | Norton et al. | .................. | 463/36 |
| 5,831,584 A * | 11/1998 | Socks et al. | ..................... | 345/8 |
| 5,930,741 A * | 7/1999 | Kramer | ....................... | 702/153 |
| 5,982,353 A * | 11/1999 | Gallery et al. | .................. | 345/156 |
| 5,984,880 A * | 11/1999 | Lander et al. | ............... | 600/595 |
| 5,986,549 A * | 11/1999 | Teodorescu | ................. | 340/561 |
| 5,986,643 A * | 11/1999 | Harvill et al. | ............... | 345/156 |
| 6,005,548 A * | 12/1999 | Latypov et al. | ............. | 345/156 |

(Continued)

FOREIGN PATENT DOCUMENTS

JP 2000353248 * 12/2000

OTHER PUBLICATIONS

Oshima et al. "Ar2 Hockey: A case study of collaborative augmented reality".*

(Continued)

*Primary Examiner*—Weilun Lo
*Assistant Examiner*—Steven B Theriault
(74) *Attorney, Agent, or Firm*—Fitzpatrick, Cella, Harper & Scinto (57) ABSTRACT

An information processing apparatus generates and displays a mixed reality image in which a plurality of subjects have virtual objects by their hands. The apparatus includes a unit for measuring a position of the hand of the subject, a unit for measuring a view position and a view direction of the subject, and a unit for generating the virtual object and synthesizing the virtual object with the real space image. Also included is an upcast action detecting unit for calculating a shifting speed of the hand in an upward direction and for detecting an upcast action, a unit for judging that the hand is stopped and a determining unit for determining a partner subject to whom the virtual object is upcast.

5 Claims, 7 Drawing Sheets

U.S. PATENT DOCUMENTS

| | | | | |
|---|---|---|---|---|
| 6,070,269 | A * | 6/2000 | Tardif et al. | 2/69 |
| 6,072,467 | A * | 6/2000 | Walker | 345/157 |
| 6,078,329 | A * | 6/2000 | Umeki et al. | 345/419 |
| 6,084,587 | A * | 7/2000 | Tarr et al. | 345/419 |
| 6,215,498 | B1 * | 4/2001 | Filo et al. | 345/419 |
| 6,278,418 | B1 * | 8/2001 | Doi | 345/7 |
| 6,298,314 | B1 * | 10/2001 | Blackadar et al. | 702/178 |
| 6,298,374 | B1 * | 10/2001 | Sasaki et al. | 709/204 |
| 6,435,794 | B1 * | 8/2002 | Springer | 414/5 |
| 6,473,717 | B1 * | 10/2002 | Claussen et al. | 702/153 |
| 6,522,312 | B2 * | 2/2003 | Ohshima et al. | 345/8 |
| 6,624,802 | B1 * | 9/2003 | Klein et al. | 345/156 |
| 6,685,566 | B2 * | 2/2004 | Ohshima | 463/32 |
| 6,745,069 | B2 * | 6/2004 | Nissilä et al. | 600/523 |
| 6,757,068 | B2 * | 6/2004 | Foxlin | 356/620 |
| 6,771,294 | B1 * | 8/2004 | Pulli et al. | 715/863 |
| 6,909,420 | B1 * | 6/2005 | Nicolas et al. | 345/156 |
| 6,951,515 | B2 * | 10/2005 | Ohshima et al. | 463/31 |
| 6,955,603 | B2 * | 10/2005 | Jeffway et al. | 463/36 |
| 6,972,734 | B1 * | 12/2005 | Ohshima et al. | 345/8 |
| 7,042,438 | B2 * | 5/2006 | McRae et al. | 345/156 |
| 2001/0003712 | A1 * | 6/2001 | Roelofs | 463/37 |
| 2001/0045919 | A1 * | 11/2001 | Ishikawa et al. | 345/8 |
| 2002/0024675 | A1 * | 2/2002 | Foxlin | 356/620 |
| 2002/0130862 | A1 * | 9/2002 | Lee et al. | 345/420 |
| 2002/0140674 | A1 * | 10/2002 | Okuno et al. | 345/158 |
| 2002/0198472 | A1 * | 12/2002 | Kramer | 600/595 |
| 2004/0041828 | A1 * | 3/2004 | Zellhoefer | 345/706 |
| 2004/0095311 | A1 * | 5/2004 | Tarlton et al. | 345/156 |
| 2004/0201857 | A1 * | 10/2004 | Foxlin | 356/620 |

OTHER PUBLICATIONS

Cheok et al. "Touch-space: Mixed Reality game space based on ubiquitous, tangible and social computing" 2002.*
Foxlin et al. "WearTrack: A Self-Referenced Head and Hand Tracker for wearable computers and Portable VR" 1997.*
Rekimoto, et al. "GestureWrist and GesturePad: Unobtrusive Wearale Interaction Devices" 1999.*
Aggarwal et al. "Human Motion Analysis: A review".*
U.S. Appl. No. 09/045,993, filed Mar. 23, 1998.
U.S. Appl. No. 09/510,334, filed Feb. 22, 2000.

* cited by examiner

INFORMATION PROCESSING APPARATUS AND METHOD

BACKGROUND OF THE INVENTION

1. Field of the Invention

The present invention relates to a technique for controlling a virtual object in a compound real-like space image by an action of a hand of a subject.

2. Related Background Art

As user interfaces in compound real-like systems, there have been proposed a method for recognizing a gesture from a position of a hand obtained by a position sensor and a method for recognizing a direction along which a hand is moved.

However, regarding the casting of a virtual object, it was difficult to judge a moment when the virtual object is left from the hand by an upcast action and starts to move. Further, it was possible to identify a partner who receives based on a direction along which the hand is moved, but there were problems that collision accident may occur in a narrow area and control of a delicate direction is difficult.

Further, in order to generate an event in which objects are exchanged with each other simultaneously, since it was necessary to align timings for casting completely, it was difficult to generate such an event easily.

SUMMARY OF THE INVENTION

The present invention is made in consideration of the above-mentioned problems, and an object of the invention according to one aspect is to realize the casting of a virtual object to a partner who is desired by a subject by a simple and safe method in an apparatus for generating a compound real-like space image by synthesizing a real space image and a virtual space image.

Further, an object of the invention according to another aspect is to easily realize simultaneous exchanging.

In order to achieve the above objects, the present invention according to one aspect under the above objects relates to an information processing apparatus for generating and displaying a compound real space image in which a plurality of subjects have virtual objects by their hands respectively, by synthesizing a real space image and a virtual space image representing a virtual object, comprising means for measuring a position posture of the hand of the subject, means for measuring a view position and a view direction of the subject, and means for generating the virtual object in dependence upon the view position, the view direction and the position posture of the hand, and synthesizing the virtual object image with the real space image, and further comprising upcast action detecting means for calculating a shifting speed of the hand in an upward direction and for detecting an upcast action, means for judging that the hand is stopped if the shifting speed of the hand in the upward direction becomes smaller than a predetermined value after the upcast action was detected by the detecting means, and determining means for determining a partner subject to whom the virtual object is upcast on the basis of the view position and the view direction of the subject when it is judged that the hand is stopped.

The present invention according to another aspect under the above object comprises judging means for judging whether or not the partner subject is effecting the upcast action when the judged upcast action to the partner subject is decided, measuring means for measuring the view direction of the partner subject, and control means for controlling a timing of processing for casting and receiving the virtual object between the subject and the partner subject in accordance with a judged result of the judging means and a measured result of the measuring means.

The present invention according to a further aspect under the above objects relates to an information processing method in which a position posture of a hand of a subject is measured, a view position and a view direction of the subject are measured, a virtual space image is generated in accordance with the view position, the view direction and the position posture of the hand, and a compound real-like space image is generated by synthesizing the virtual space image with a real space image, and wherein, when a shifting speed of the hand of the subject is detected and a condition that the shifting speed is not less than a predetermined value continues for a time not less than a predetermined time, the virtual space image is moved to another subject, and the another subject to whom the virtual space image is to be shifted is judged on the basis of the view position and the view direction when the shifting speed of the hand becomes smaller than a predetermined value after the condition that the shifting speed of the hand continues for the time not less than the predetermined time.

The present invention according to a further aspect under the above objects is characterized in that, if a condition that a shifting speed of a hand of another subject is not less than a predetermined value continues when the shifting speed of the hand becomes smaller than a predetermined value after a condition that the shifting speed of the hand is not less than the predetermined value continues for the time not less than the predetermined time, the respective virtual space images are moved from each other simultaneously between the subject and the another subject.

The other objects, advantages and features of the present invention will be apparent from the following detailed explanation of the invention.

DETAILED DESCRIPTION OF THE PREFERRED EMBODIMENTS

The present invention will now be explained in connection with embodiments thereof with reference to the accompanying drawings.

First Embodiment

Figure 1:
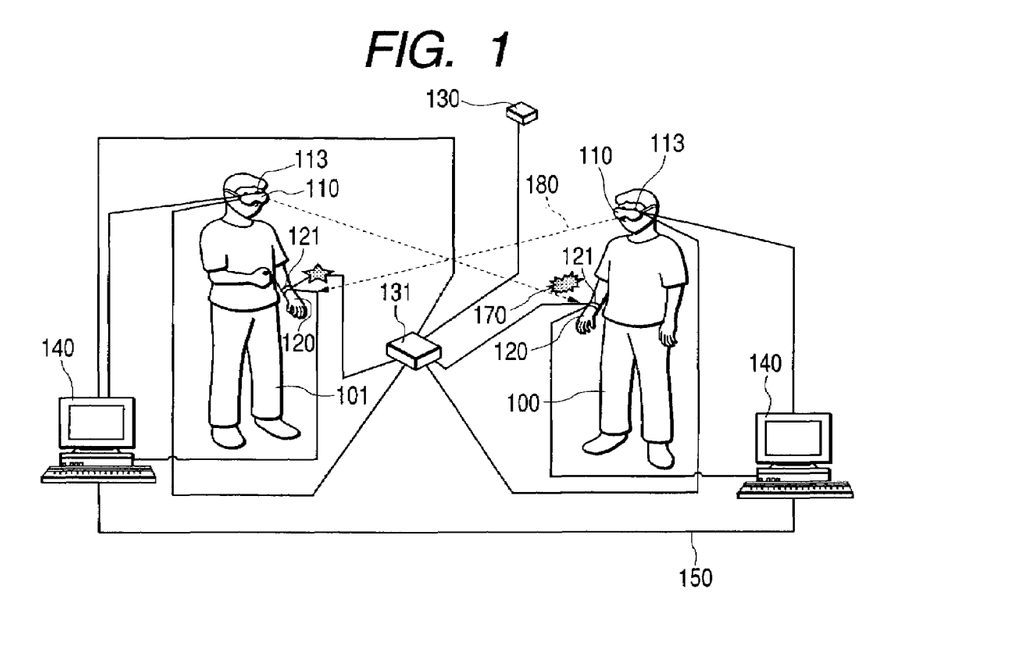
FIG. 1 is a system constructural view showing a schematic construction of a compound real-like system.

FIG. 1 is a system constructural view showing a schematic construction of a compound real-like system to which a first embodiment of the present invention is applied.

A first observer 100 wears an HMD (Head Mount Display) 110 on his head and a glove 120 on his hand.

Figure 2:
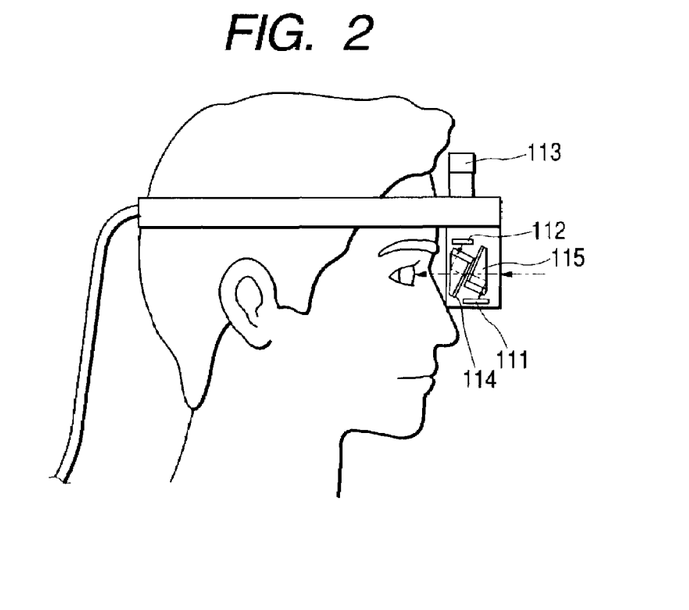
FIG. 2 is a constructural view showing a construction of an HMD.

As shown in FIG. 2, the HMD 110 is constituted by a video camera 111, an LCD 112, a position direction measuring device receiver (position sensor for eyes) 113, and optical prisms 114, 115. The video camera 111 photo-takes a real space image in a view position and a view direction of the observer directed by the optical prism 115. The position sensor 113 for eyes is utilized to measure the view position and the view direction of the observer. The LCD 112 serves to display a compound real space image and the image is directed to the observer by the optical prism 114.

The glove 120 incorporates therein a position sensor 121 for a hand and a speaker (not shown). The position sensor 121 for hand is utilized as a sensor for measuring a position and a direction of the hand of the observer. The speaker emits a sound corresponding to an event generated at the hand position. As such a sound, for example, a sound generated when a virtual space object is touched or struck by the hand or a sound generated when a state of the virtual space object displayed in sync with the hand position is changed can be considered.

There are provided a position direction measuring device transmitter (position sensor transmitter) 130 and a position direction measuring device main body (position sensor main body) 131. The position sensor 113 for eyes, the position sensor 121 for hand and the position sensor transmitter 130 are connected to the position sensor main body 131. The position sensor transmitter 130 emits magnetism, and the magnetism is received by the position sensor 113 for eyes and the position sensor 121 for hand. The position sensor main body 131 calculates positions and directions of the eyes and the hand on the basis of received intensity signals from the position sensor 113 for eyes and the position sensor 121 for hand. Here, as the position direction measuring device, FAS-TRAK manufactured by Polhemus Inc. in USA can be used.

A processing apparatus 140 serves to produce the compound real space image for one observer and to display such an image on the HMD 110. For example, the processing apparatus 140 is constituted by a personal computer, and a video capture card, a video card having a CG drawing function or a sound card. The HMD 110, the speaker and the position sensor main body 131 are connected to the processing apparatus 140.

A virtual character 170 is compounded as if it is rested on the hand of the first observer 100. A view line of the first observer is denoted by the reference numeral 180. The view line can be measured by the position sensor 113 for eyes, the position sensor transmitter 130 and the position sensor main body 131. A second observer 101 also has the same construction as the first observer.

Figure 3:
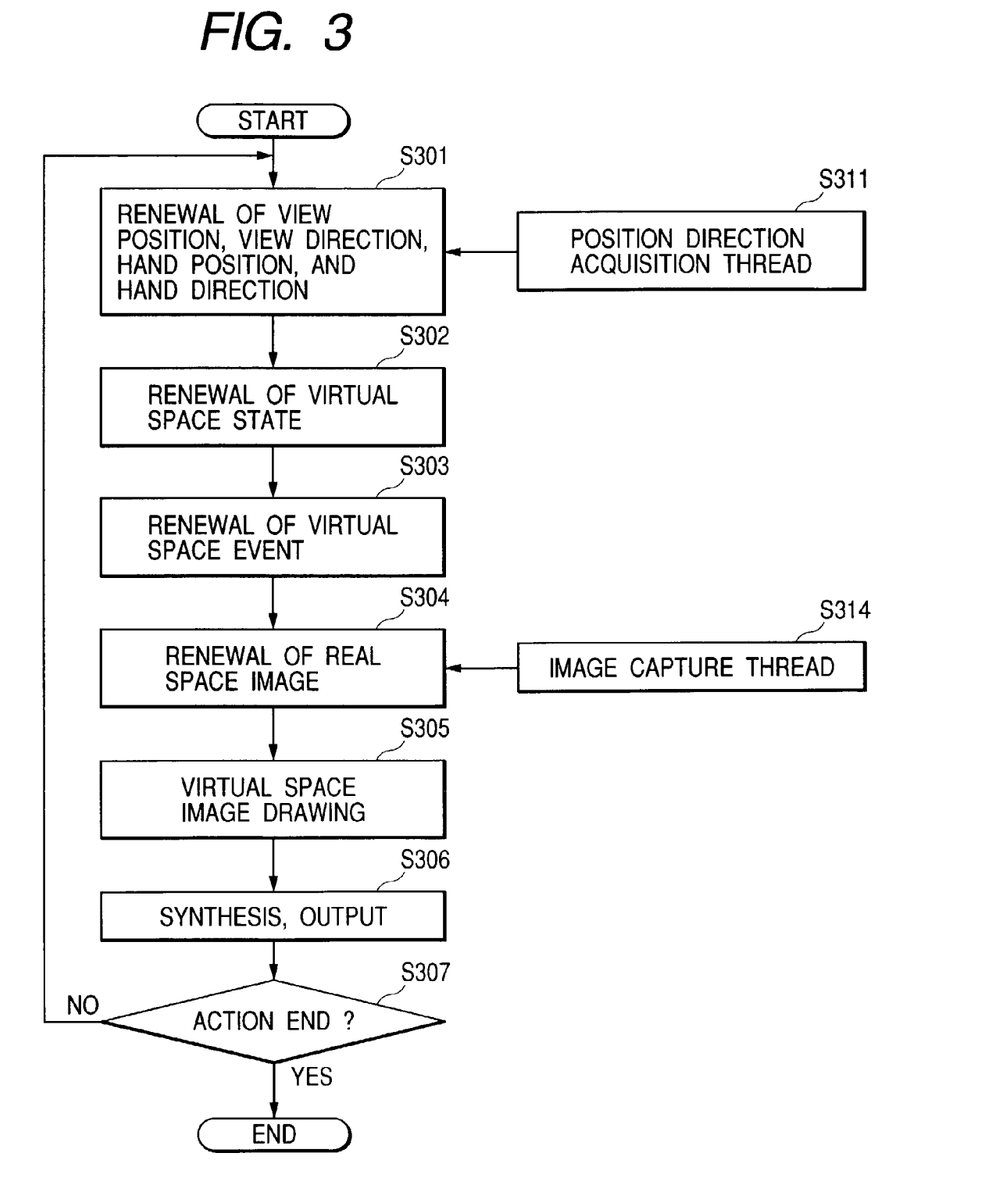
FIG. 3 is a flow chart showing production processing for a compound real space image.

Next, a procedure for producing the compound real space image in the processing apparatus 140 will be explained with reference to a flow chart shown in FIG. 3.

First of all, the processing apparatus 140 takes the view position and the view direction, and the position and direction of the hand sent from the position sensor main body 131 (step S301). Incidentally, in the step S301, thread S311 for periodically acquiring the view position and the view direction, and the position and direction of the hand sent from the position sensor main body 131 is utilized.

Then, the time of the virtual space is renewed and a virtual space state (kind, position and condition of the virtual space object) is renewed (step S302). In this case, if there is a virtual space object in which a position direction thereof is changed in sync with the position direction of the real space object, such an object is also renewed together. For example, when it is pretended to be a condition that the character of the virtual always rides on the hand, in this step S302, the position direction of the glove is renewed.

Then, a relationship between the position direction (position of hand and view position) of the real space object and the position direction of the virtual space object is checked, and, if it is judged that a pre-defined event is generated, the condition of the virtual space is renewed in accordance with such an event (step S303). For example, it is considered that, if the virtual space object is touched by the hand, the virtual space object is exploded.

Then, the real space image in the view position and the view direction of the observer obtained from the video camera 111 is taken in (step S304). In this step S304, thread S314 for periodically acquiring the virtual space image obtained by the video camera 111 from the video capture card is utilized.

And, the virtual space image from the view position and the view direction of the observer acquired in the step S301 is produced in accordance with the condition of the virtual space renewed in the steps S302 and S303 (step S305).

Lastly, the virtual space image produced in the step S305 is synthesized with the real space image taken-in in the step S304, and the synthesized image is outputted to the LCD 112 of the HMD 110 (step S306). The above-mentioned processing operations are carried out repeatedly until any end action is effected (step S307).

Figure 4:
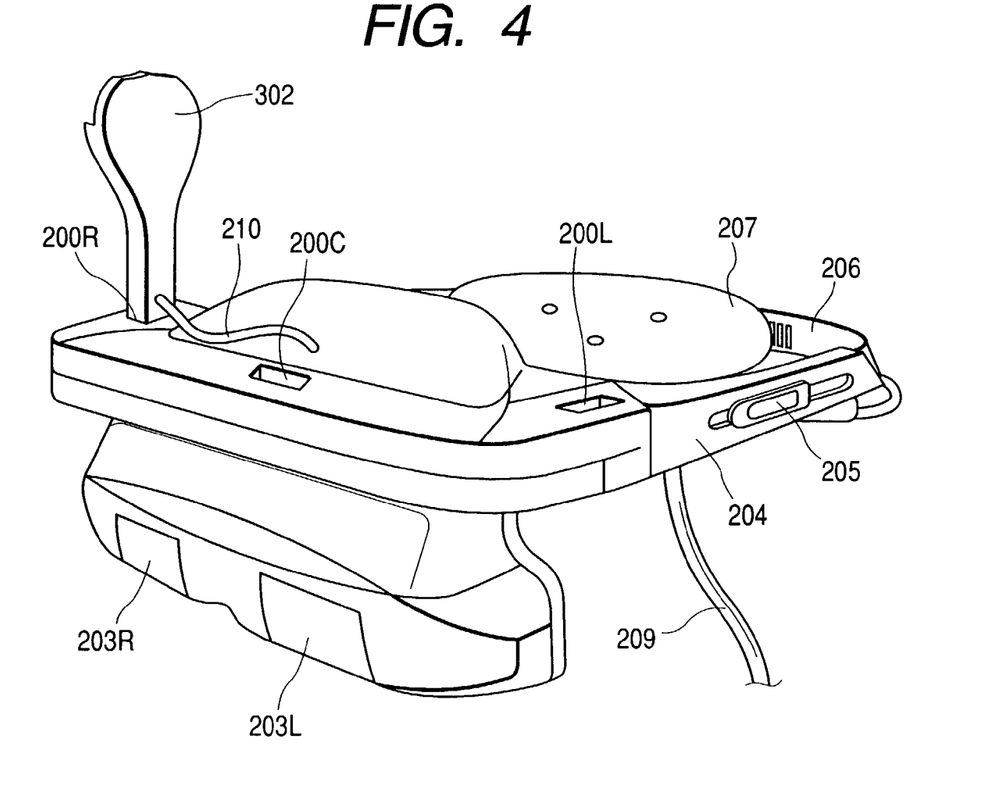
FIG. 4 is a perspective view of the HMD, looked at from a direction of a photo-taking portion.
Figure 5:
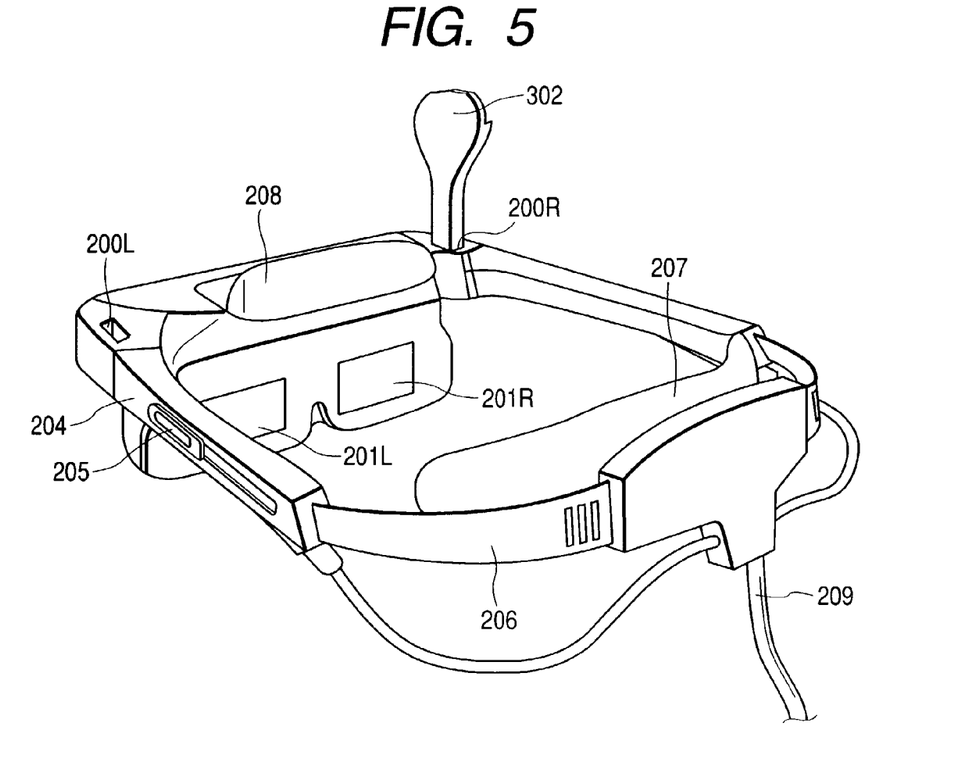
FIG. 5 is a perspective view of the HMD, looked at from a displaying portion.

FIGS. 4 and 5 are perspective views of the HMD 110, where FIG. 4 is a perspective view looked at from a direction of a photo-taking portion and FIG. 5 is a perspective view looked at from a displaying portion.

The HMD includes an HMD displaying portion 201. The HMD displaying portion 201 has two displaying portions, i.e. a displaying portion 201R for right eye and a displaying portion 201L for left eye, and each displaying portion includes a color liquid crystal and a prism and serves to display the compound real space image corresponding to the view position and the view direction of the observer.

There are provided constructional members 204 to 208 for head mounting. When the HMD 301 is mounted on the head, first of all, the HMD is worn on the head with a condition that a length adjusting portion 206 loosened by an adjuster 205. Then, after a forehead mounting portion 208 is closely contacted with the forehead, the length adjusting portion 206 may be tightened by the adjuster 205 so that a side head mounting portion 204 and a rear head mounting portion 207 are closely contacted with the side head portion and the rear head portion, respectively.

There is provided an HMD photo-taking portion 203 for photo-taking the real space image in the view position and the view direction of the observer. The HMD photo-taking portion 203 has two photo-taking portions, i.e. a photo-taking portion 203R for right eye and a photo-taking portion 203L for left eye, and each photo-taking portion is constituted by a small-sized camera of NTSC type. The photo-taken real space image is overlapped with the virtual space image to generate the compound real space image.

A receiver 302 is utilized to receive magnetism emitted from the transmitter as information for measuring the view position and the view direction of the subject. As attachment portions for attaching the receiver 302 to the HMD 301, there are three portions, i.e. receiver joint portions 200R, 200L and 200C, so that the receiver can be detachably attached to any of these receiver joint portions 200R, 200L and 200C. That is to say, in FIGS. 4 and 5, although the receiver 302 is attached to the receiver joint portion 200R at the right in the advancing direction of the view line of the observer, it can be attached to the receiver joint portion 200L at the left in the advancing direction of the observer or to the receiver joint portion 200C on the middle line of the observer.

In the illustrated embodiment, although the receiver joint portions 200R, 200L and 200C each has a construction having an insertion opening into which the receiver 302 is fixedly inserted, other detachable joint (attachment) systems may be used.

A receiver signal line 210 is exposed externally of the HMD 301 from the vicinity of the receiver joint portion 200C. The receiver signal line 210 has an adequate length so that the receiver 302 can be attached to either of the receiver joint portions 200R, 200L and 200C.

There is provided bundled wires 209 obtained by bundling signal lines and power supply wires for the HMD displaying portion 201 and the HMD photo-taking portion 203 and various wires such as the receiver signal line 210 and the like, and the bundled wires are attached to the rear head mounting portion 207. The signal lines and the power supply wires, among the bundled wires 209, for the left and right HMD displaying portions 201R, 201L, HMD photo-taking portions 203R, 203L and the like are passed through the left and right side head mounting portions 204.

Figure 6:
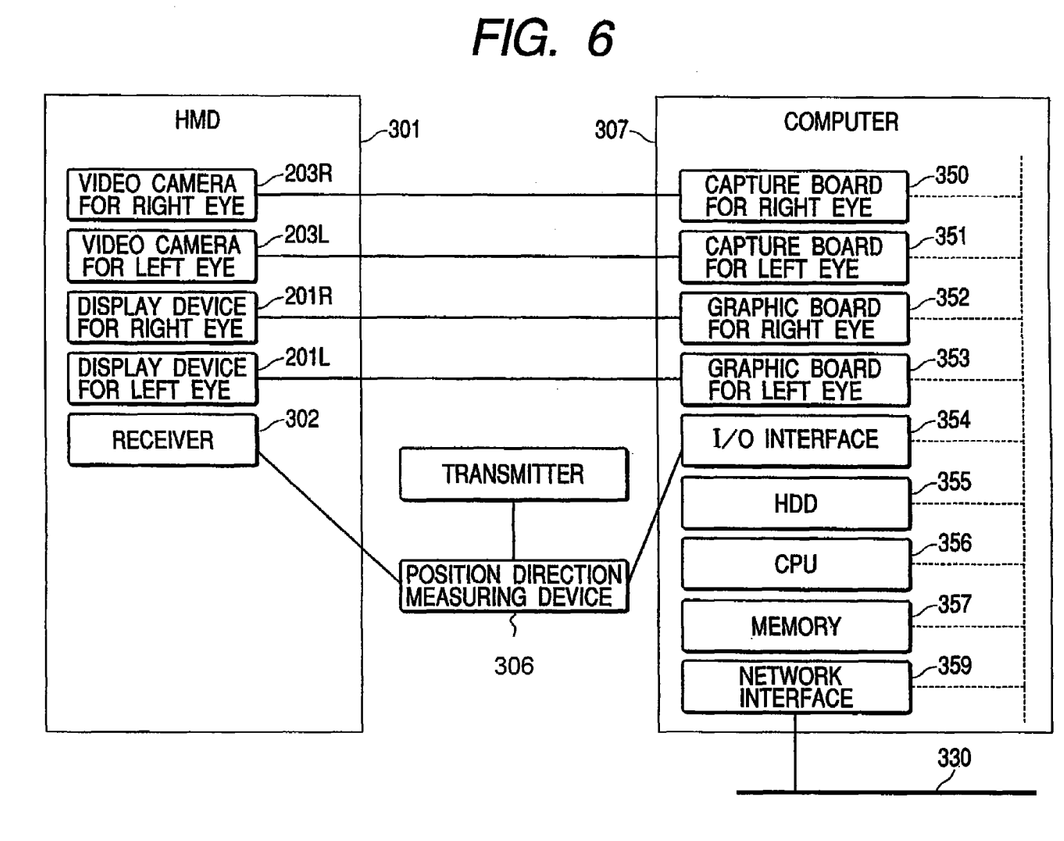
FIG. 6 is a block diagram showing a hardware construction for one observer in the system of FIG. 1.

FIG. 6 is a block diagram showing a hardware construction for one observer in the system of FIG. 1. A processing apparatus (computer) 307 includes a video capture board 350 for right eye, a video capture board 351 for left eye, a graphic board 352 for right eye, a graphic board 353 for left eye, an I/O interface 354 and a network interface 359, and these elements are connected to a CPU 356, an HDD 355 and a memory 357.

The video capture boards 351, 350 for left and right eyes are connected to video cameras 203L, 203R for left and right eyes, respectively, so that the actually taken images photo-taken by the video cameras 203L, 203R can be converted to forms which can be synthesized with the virtual space image in the processing apparatus 307. Further, the graphic boards 353, 352 for left and right eyes are connected to the displaying portions (display devices) 201L, 201R for left and right eyes, respectively, thereby to effect display control for these displaying portions 201L, 201R for left and right eyes.

Further, the I/O interface 354 is connected to a position direction measuring device main body 306 and the network interface 359 is connected to a network 330.

In the illustrated embodiment, by using the above-mentioned system, a water surface of CG is generated on a palm of the hand, and, further, the compound real space image for synthesizing the virtual character is provided there.

In the illustrated embodiment, the operation of the virtual character is controlled by using the action of the hand. Hereinbelow, a method for effecting the casting of the virtual character will be concretely explained with reference to FIGS. 7 and 8.

Figure 7:
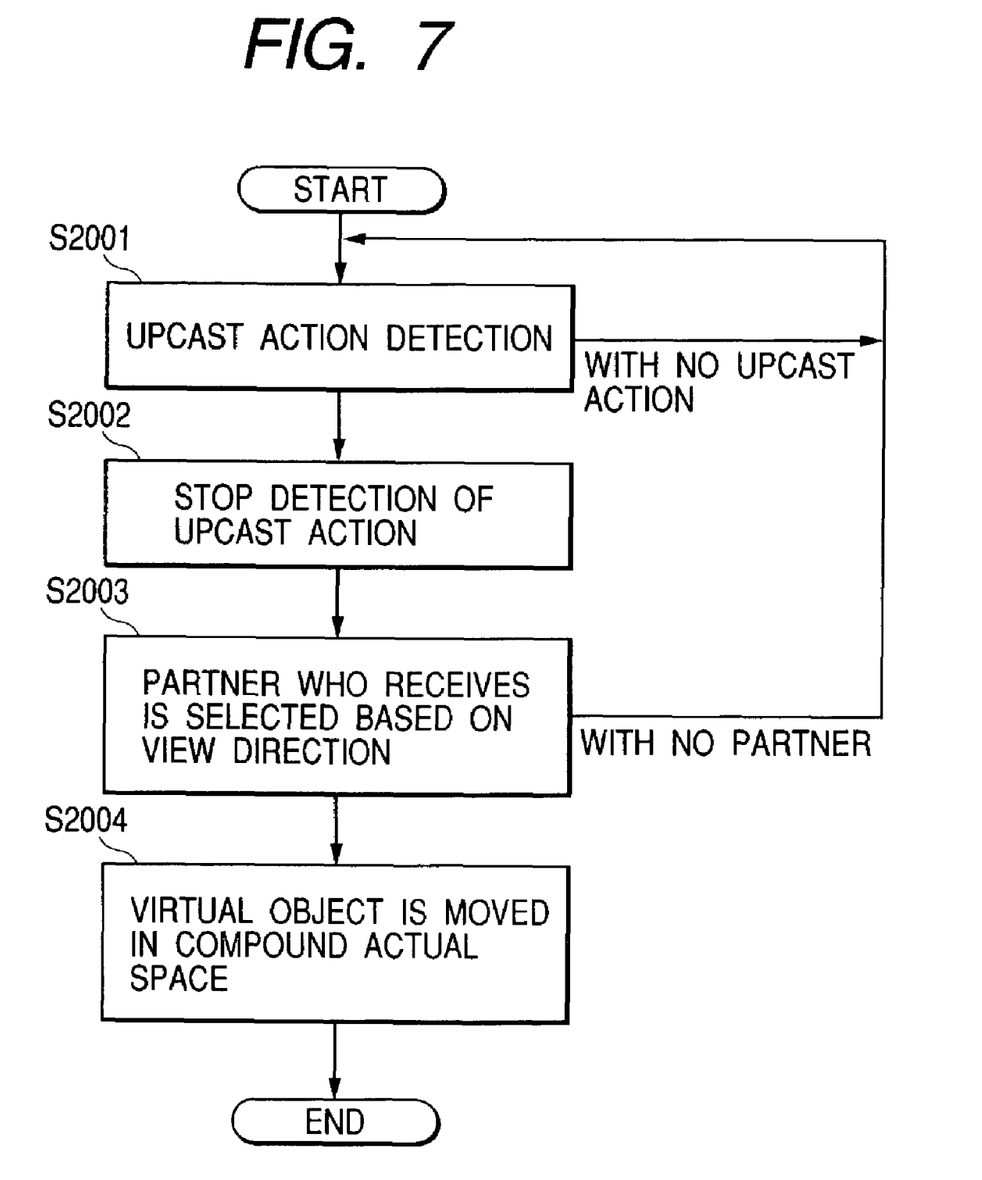
FIG. 7 is a flow chart showing processing for a casting event.

In a step S2001, the upcast action is detected from the measured result of the position sensor for hand. For example, the fact that the first observer 100 is moving his hand upwardly at a speed not less (greater) than a predetermined speed (value) for a time period not less (greater) than a predetermined time (value) is detected. That is, the detection of the upcast action is executed by comparing the speed and the time of the upcast action with the predetermined value. The hand motion can be detected by analyzing the progress of the hand position detected by the position sensor 121 for hand.

In a step S2002, from the measured result of the position sensor for hand, by detecting the time when the ascending speed (value) of the hand becomes smaller (not more) than a predetermined speed (value) after the upcast action was detected in the step S2001, the stopping of the upcast action is detected. That is, the stopping of the upcast action is detected by comparing the speed of the upcast action with the predetermined value.

In a step S2003, the partner who receives the virtual character is judged. In FIG. 1, although only two observers are drawn and other observers are omitted, in the illustrated embodiment, it is assumed that at least one observer is present other than the drawn observers. The partner who receives is determined from the view line 180 of the first observer 100 at the moment when the stopping of the upcast action is detected in the step S2002.

As shown in FIG. 1, since each observer has the position sensor, the position of each observer can be grasped. In the step S2002, the observer who exists at a position nearest to the view direction of the observer who is effecting the upcast action is detected, and the detected observer is determined as the partner who receives. Now, it is assumed that the second observer 101 is the partner who receives and explanation continues.

In a step S2004, the virtual character (virtual object) is moved in the compound real space to jump the virtual character toward the hand of the second observer determined in the step S2003. This can be realized by controlling the drawing of the virtual space image in the step S305 of FIG. 3 and synthesis in the step S306.

Through the above-mentioned processing operations, by the simple upcast action using the hand, the upcast action of the virtual object to the second observer can be realized.

According to the illustrated embodiment, the determination of the moment when the movement is started from the position sensor for hand can be judged simply and properly, and the partner can be determined easily and properly from the view direction determined from the sensor for eye. Thus, according to the illustrated embodiment, the upcast action of the virtual object to any observer can be determined easily and properly.

Next, a method for effecting simultaneous exchanging of the virtual characters will be explained with reference to FIG. 8.

Procedures until the partner who receives is determined in the step S2003 are the same as those shown in FIG. 7. In a step S2005, the state of the partner who receives (second observer) is checked, and, if the second observer is effecting the upcast action, in a step S2006, the view direction of the second observer is judged, and, if the second observer is looking at the first observer, in a step S2007, the event for effecting the simultaneous exchanging is generated. As such, according to the illustrated embodiment, the timing for casting the virtual object can easily be fitted.

If the steps S2005 and S2006 are not established, in the step S2004, the virtual character is merely cast from the first observer to the second observer.

According to the illustrated embodiment, in the apparatus for producing and displaying the compound real-like space image by synthesizing the real space image with the virtual space image, the upcasting of the virtual object to the partner who is desired by the subject can be effected by the convenient and safe method, and the simultaneous exchanging can also be realized.

Other Embodiments

Figure 8:
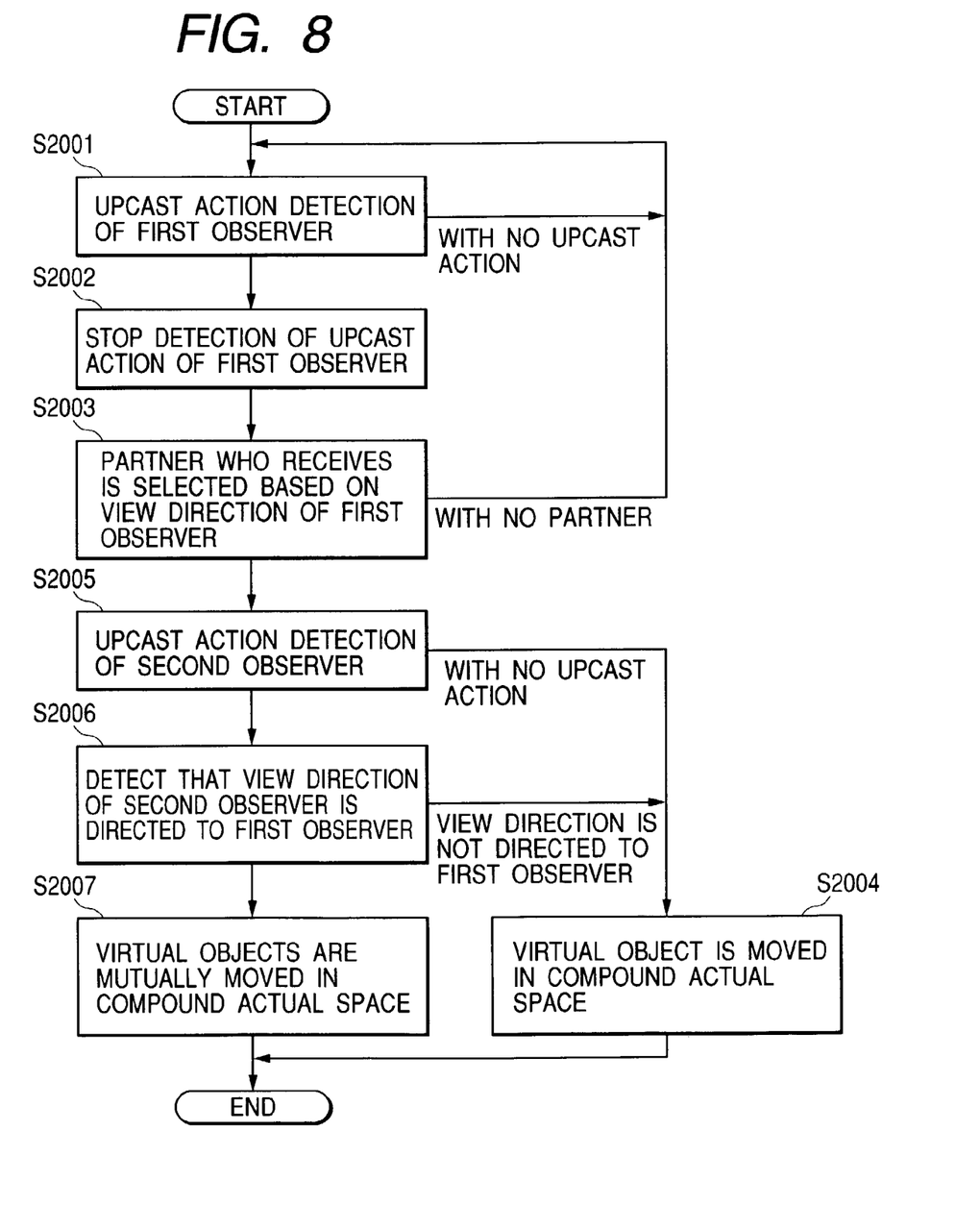
FIG. 8 is a flow chart showing processing for a simultaneous exchanging event.

It should be noted that the present invention includes a concept that a program code of software for realizing the functions of the above-mentioned embodiment is supplied to a computer in an apparatus or a system connected to various devices to operate such devices thereby to realize the functions shown in FIGS. 7 and 8, and the various devices are operated in accordance with a program stored in the computer (CPU or MPU) of the apparatus or the system.

In this case, the program code of the software itself realizes the functions of the above-mentioned embodiment, and, thus, the program code itself and means for supplying the program code to the computer, for example, a storing medium storing such a program code constitute the present invention.

As the storing medium for storing such a program code, for example, a floppy disk, a hard disk, an optical disk, a photomagnetic disk, CD-ROM, a magnetic tape, a non-volatile memory card or ROM can be used.

Further, it should be noted that, when not only the functions of the above-mentioned embodiment are realized by executing the supplied program code by means of the computer, but also the function of the above-mentioned embodiment are realized in cooperation with OS (operating system) in which the program code is worked in the computer or other application software, the program code constitutes the present invention.

Further, it should be noted that the present invention includes a concept that, after the supplied program code is stored in a memory of function expansion board inserted into the computer or of a function expansion unit connected to the computer, a CPU of the function expansion board or of the function expansion unit executes the actual processing partially or totally on the basis of instruction of the program code to realize the functions of the above-mentioned embodiment.

Although the present invention was explained in connection with preferred embodiments thereof, any person skilled in the art can recognize that various modifications and alterations can be made without departing from the sprit and scope of the invention.

What is claimed is:

1. An information processing apparatus for generating and displaying a mixed reality image of a mixed reality space in which a plurality of players have virtual objects by their hands respectively, by combining a real space image and a virtual space image representing a virtual object, comprising:
   a first measuring unit adapted to measure a position of the hand of the player;
   a second measuring unit adapted to measure a view position and a view direction of a head mount display of the player, said second measuring unit being disposed on the head mount display;
   a management unit adapted to manage a stage of a virtual space based on the measured position of the hand of the player;
   a generation unit adapted to generate the virtual space image based on the state of the virtual space, the measured view position and the view direction of the player;
   a combining unit adapted to combine the virtual space image and the real space image, with the head mount display adapted to display the combined image;
   an upcast action detecting unit adapted to detect an upcast action based on a shifting speed of the hand in an upward direction;
   a first judging unit adapted to judge that the hand is stopped if the shifting speed of the hand in the upward direction becomes smaller than a predetermined value after the upcast action was detected by said upcast action detecting unit;
   a determining unit adapted to determine from other players a partner player to whom the virtual object is upcast, on the basis of the view position and the view direction of the player and view positions of other players when it is judged that the hand is stopped; and
   a control unit adapted to control the state of the virtual space so that in the virtual space a position of the virtual object corresponding to the hand of which the upcast action was detected is changed toward the partner player, according to the detected result of the upcast action.

2. An information processing apparatus according to claim 1, further comprising a second judging unit adapted to judge whether or not the partner player is effecting the upcast action when the upcast action to the determined partner player is decided;
   a third measuring unit adapted to measure the view direction of the partner player; and
   a timing control unit adapted to control a timing of processing for mutually casting and receiving the virtual object between the player and the partner player in accordance with a judged result of said second judging unit and a measured result of said third measuring unit.

3. An information processing method in which a position of a hand of a player is measured, a view position and a view direction of the player are measured by a measuring unit, a virtual space image is generated in accordance with the view position, the view direction and the position of the hand, and a mixed reality image is generated by combining the virtual space image with a real space image, said method comprising the steps of:
   detecting an upcast action based on a shifting speed of the hand in an upward direction;
   determining that the hand is stopped if the shifting speed in the upward direction becomes smaller than a predetermined value after the upcast action is detected;
   determining a partner player to whom the virtual object is upcast, on the basis of the view position and the view direction of a head mount display of the player, the measuring unit being disposed on the head mount display. and view positions of other players when it is judged that the hand is stopped; and
   moving the state of the virtual space so that in the virtual space a position of the virtual object corresponding to the hand of which the upcast action was detected is changed toward the partner player, according to the detected result of the upcast action.

4. An information processing method according to claim 3, wherein, if a condition that a shifting speed of a hand of another player is not less than a predetermined value continues when the shifting speed of the hand becomes smaller than a predetermined value after a condition that the shifting speed of the hand is not less than the predetermined value continues for the time not less than the predetermined time, the respective virtual space images are moved each other simultaneously between the player and the another player.

5. A computer-readable storage medium encoded with a computer program realizing an information processing method in which a position of a hand of a player is measured, a view position and a view direction of the player are measured by a measuring unit, a virtual space image is generated in accordance with the view position, the view direction and the position of the hand, and a mixed reality image is generated by combining the virtual space image with a real space image, said computer program causing execution of the steps of:
   detecting an upcast action based on a shifting speed of the hand in an upward direction;
   determining that the hand is stopped if the shifting speed in the upward direction becomes smaller than a predetermined value after the upcast action is detected;
   determining a partner player to whom the virtual object is upcast, on the basis of the view position and the view direction of a head mount display of the player, the measuring unit being disposed on the head mount display, and view positions of other players when it is judged that the hand is stopped; and
   moving the state of the virtual space so that in the virtual space a position of the virtual object corresponding to the hand of which the upcast action was detected is changed toward the partner player, according to the detected result of the upcast action.

* * * * *